United States Patent
Esaki et al.

(10) Patent No.: US 6,963,801 B2
(45) Date of Patent: Nov. 8, 2005

(54) VEHICLE NAVIGATION SYSTEM HAVING POSITION CORRECTING FUNCTION AND POSITION CORRECTING METHOD

(75) Inventors: Motoharu Esaki, Obu (JP); Hajime Oka, Yokkaichi (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/234,459

(22) Filed: Sep. 5, 2002

(65) Prior Publication Data

US 2004/0204830 A1  Oct. 14, 2004

(51) Int. Cl.[7] ............................................. G01C 21/00
(52) U.S. Cl. ...................................... 701/207; 701/208
(58) Field of Search ................................. 701/200, 207, 701/208, 211, 23; 342/357.01, 357.13; 340/988

(56) References Cited

U.S. PATENT DOCUMENTS

| | | | | |
|---|---|---|---|---|
| 5,177,685 A | * | 1/1993 | Davis et al. | 455/456.5 |
| 6,249,740 B1 | * | 6/2001 | Ito et al. | 701/200 |
| 6,415,222 B1 | * | 7/2002 | Sato et al. | 701/208 |

FOREIGN PATENT DOCUMENTS

| | | |
|---|---|---|
| JP | A-5-99679 | 4/1993 |
| JP | A-H07-151556 | 6/1995 |
| JP | A-07-151556 | 6/1995 |
| JP | A-H08-43118 | 2/1996 |
| JP | A-H10-89979 | 4/1998 |
| JP | A-10-197268 | 7/1998 |
| JP | A-11-271080 | 10/1999 |
| JP | A-2000-122685 | 10/1999 |
| JP | A-11-337357 | 12/1999 |
| JP | A-H11-344348 | 12/1999 |
| JP | A-2000-74679 | 3/2000 |
| JP | A-2000-310541 | 11/2000 |

OTHER PUBLICATIONS

Toyota Motor Corporation, "Electro Multivision", Aug. 27, 1997.

* cited by examiner

Primary Examiner—Yonel Beaulieu
(74) Attorney, Agent, or Firm—Posz Law Group, PLC

(57) ABSTRACT

A vehicle navigation system includes a map matching module and a voice recognition module. When the voice recognition module recognizes a user's voice input specifying an exit of a parking garage, the map matching module sets a current position of a vehicle to the specified position on a map. When the voice recognition module recognizes "high," which indicates a elevated road, the current position is set onto the elevated road on the map. Likewise, the current position is set to a specific position on the map when the voice recognition module recognizes a user's voice input specifying a correct current position.

19 Claims, 2 Drawing Sheets

VEHICLE NAVIGATION SYSTEM HAVING POSITION CORRECTING FUNCTION AND POSITION CORRECTING METHOD

CROSS REFERENCE TO RELATED APPLICATION

This application is based on and incorporates herein by reference Japanese Patent Application No. 2001-67009 filed on Mar. 9, 2001.

FIELD OF THE INVENTION

The present invention relates to a vehicle navigation system capable of correcting a current position of a vehicle and a method for correcting a current position of a vehicle.

BACKGROUND OF THE INVENTION

In a vehicle navigation system, a map matching technique is used to display an accurate current position of a vehicle on a map. The current position is determined based on position information transmitted from the global positioning system (GPS) and matched by a map matching to a road on the map stored in a memory device.

When the vehicle is in a multistory or underground parking garage, it may take time until accurate map matching is performed. When a freeway and a local road (non-freeway) are parallel to each other, that is, for instance one above the other or side by side, the system may not recognize on which road the vehicle is currently located. The system may therefore not perform accurate map matching.

The same problem may occur when a elevated road and a ground-level road are in parallel to each other. The road on which the vehicle is currently located can be determined by detecting a slope of the elevated road. However, it requires an additional device such as an angle sensor.

In these cases, it takes for a while until accurate map matching is performed and therefore a current position cannot be searched accurately until then.

SUMMARY OF THE INVENTION

Therefore, the first objective of the present invention is to provide a vehicle navigation system that is capable of setting a current position of vehicle to any position on a map when the current position is different from the actual position.

The second objective is to provide a vehicle navigation system that is capable of setting a correct current position of vehicle on a map without an additional device even when the position is inaccurately searched.

The third objective is to provide a current position correcting method for a vehicle navigation system for correcting the current position when it has been searched inaccurately.

The vehicle navigation system of the present invention includes a map matching device and a voice recognition device. The map matching device matches a current position of a vehicle to a road on a map stored in a memory device, including a CD-ROM and a DVD-ROM. When the voice recognition device recognizes user's voice input that specifies a current position of the vehicle, the map-matching device sets the specified position on the map.

By utilizing a voice input from the user, a correct current position of the vehicle can be set on a map without an additional device even in places difficult to search the correct position. Furthermore, the correct current position can be set whenever a correction to the position is necessary whether the vehicle is in motion.

The current position correcting method of the present invention includes the following steps for correcting a current position of a vehicle when the current position is incorrect. First, a voice input specifying a correct current position of the vehicle is inputted to the voice recognition device. Secondly, the voice input is recognized by the voice recognition device. Thirdly, the voice input is sent to the map matching device. Lastly the current position of the vehicle is set to the correct position on a map specified by the voice input.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiment of the present invention will be explained with reference to the accompanying drawings.

Figure 1:
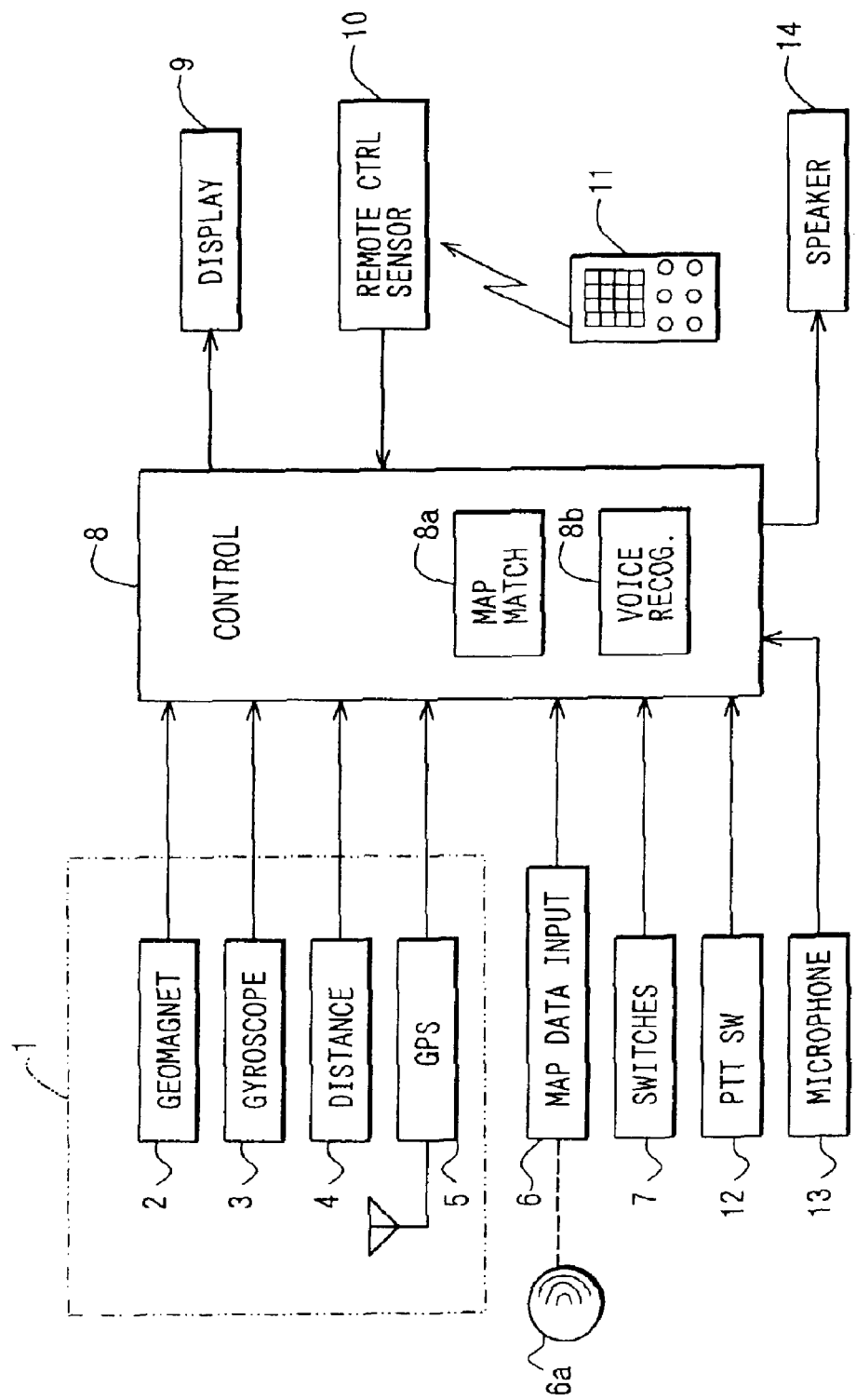
FIG. 1 is a block diagram showing a configuration of vehicle navigation system according to the embodiment of the present invention.

Referring to FIG. 1, a navigation system includes a position determination unit 1, a map data input device 6, switches 7, a control device 8, a display device 9, a remote control sensor 10, a PTT switch 12, a microphone 13, and a speaker 14.

The position determination unit 1 includes a geomagnetic sensor 2, a gyroscope 3, a distance sensor 4, and a GPS receiver 5. The map data input device 6 inputs map data retrieved from a memory device 6a, such as a CD-ROM or a DVD-ROM, to the control device 8. The switches 7 are used for navigation related operations. The switches 7 may include touch switches included in the display device 9 and mechanical switches. The control device 8 executes various operations required for the navigation. The display device 9 displays images including a map. The remote control sensor 10 receives signals from a remote control device 11.

The control device 8 displays the map with the current position of the vehicle on the display device 9. When the user manipulates the switches 7 or remote control device 11 for the navigation, the control device 8 retrieves the map data from the memory device 6a and sets a route to a destination. Then, it displays the route on the display device 9. It also provides an audio guidance for an intersection via the speaker 14 when an action needs to be taken at the intersection.

The control device 8 further includes a map matching module 8a and a voice recognition module 8b. The map matching module 8a matches a current position of the vehicle to a road on the map utilizing map data stored in the memory device 6a. The voice recognition module 8b recognizes voice inputs from a user. When the PTT switch 12 is manipulated, a voice input is inputted to the voice recognition module 8b via the microphone 13 and processed. The user can input various voice inputs to the navigation system via the voice recognition module 8*a*.

Figure 2:
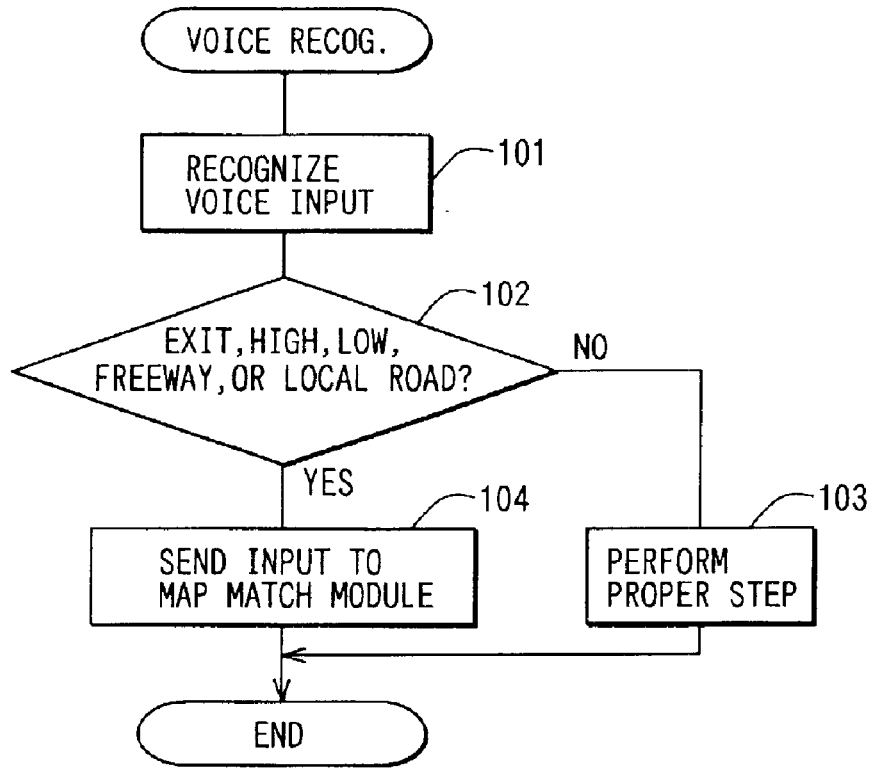
FIG. 2 is a flow chart showing a process of voice recognition performed by a voice recognition module according to the embodiment.

When the user inputs a voice input by manipulating the PTT switch 12, the voice recognition module 8*b* performs the processing shown in FIG. 2. In step 101, it recognizes a voice input from the user. In step 102, it determines whether the input is any one of the following: exit of parking garage, high, low, freeway, and local road. If the input is none of the above, it performs a step corresponding to the input in step 103. If the input is one of the above, it sends the input to the map matching module 8*a* in step 104.

Figure 3:
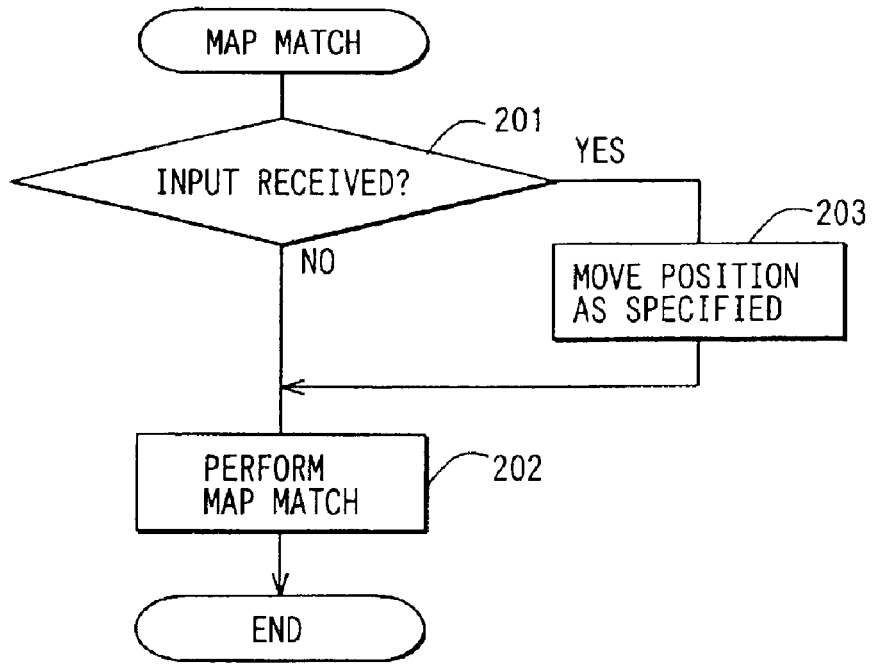
FIG. 3 is a flow chart showing a process of map matching performed by the map matching module according to the embodiment.

The map matching module 8*a* repeats the steps shown in FIG. 3. The map matching module 8*a* determines which input it has received from the voice recognition module 8*b* in step 201. If it has not received the input, it performs the map matching to match the current position of the vehicle to a road on the map in step 202. If it has received the input, it moves the current position previously set by the map matching to the position specified by the input in step 203. For instance, if the input is "exit of parking garage," the current position is calculated and displayed near the exit of the parking garage. If the input is "high," the current position is displayed on the elevated road. If the input is "low," the current position is displayed on the ground-level road. Then, the new current position is displayed on the display device 9.

By correcting the current position of the vehicle based on the voice input from the user, inaccurate map matching can be reduced. As a result, the current position can be accurately determined. Moreover, the correction to the current position on the map can be made whenever it is necessary whether the vehicle is in motion since the input is inputted via the voice recognition module 8*b*.

The present invention should not limited to the embodiment previously discussed and shown in the figures, but may be implemented in various ways without departing from the spirit of the invention. For example, voice inputs can be any words or phases other than the ones used in the embodiment, as long as they specify those places. The current position correcting method can be used for other places in which the position search by the GPS cannot be performed accurately.

What is claimed is:

1. A vehicle navigation system comprising:
    a position determination unit for generating original position data indicating an original position of a vehicle;
    a memory device storing map data;
    a map matching means for matching a current position of the vehicle to a road on a map utilizing the map data of the memory device; and
    a voice recognition means for recognizing a voice input,
    wherein the map matching means initially sets the original position specified by the position determining unit as the current position of the vehicle on the map,
    wherein the map matching means sets an input position specified by the voice input as the current position of the vehicle on the map, after setting the original position as the current position, when the voice input specifying the input position is inputted by a user and recognized by the voice recognition means, and
    wherein the voice input identifies the input position relative to the original position.

2. The vehicle navigation system as in claim 1, wherein the map matching means sets the current position of the vehicle to near an exit of a parking garage on the map when a voice input specifying the exit of the parking garage is recognized by the voice recognition means.

3. The vehicle navigation system as in claim 1, wherein the map matching means sets the current position of the vehicle on a road on the map chosen between an elevated road and a ground-level road that are in parallel to each other when a voice input specifying the road is recognized by the voice recognition means.

4. The vehicle navigation system as in claim 1, wherein the map matching means sets the current position of the vehicle on a road of the map chosen between a toll road and a local road that are in parallel to each other when a voice input specifying the road is recognized by the voice recognition means.

5. A current position correcting method for a vehicle navigation system having a map matching module and a voice recognition module comprising steps of:
    determining an original position of a vehicle on a map based on original position data received from a position determination unit;
    receiving a voice input specifying an input position of a vehicle to the voice recognition module, after the step of determining an original position;
    recognizing the received input position;
    sending the voice input to the map matching module; and
    setting the input position specified by the voice input as a current position of the vehicle on a map,
    wherein the voice input identifies the input position relative to the original position.

6. The current position correcting method as in claim 5, further comprising the step of:
    determining whether the input position indicates a specific location,
    wherein the step of sending the voice input to the map matching module is performed when the input position is determined as such a specific location.

7. The current position correcting method as in claim 6, wherein the specific location is one of: near an exit of a parking garage, on an elevated road, and on a ground level road.

8. The vehicle navigation system as in claim 1, wherein the input position is a specific location on the map.

9. The vehicle navigation system as in claim 8, wherein the specific location is one of: near an exit of a parking garage, and on an elevated road, and on a ground level road.

10. A position correcting method for a vehicle navigation system, comprising:
    determining an original position of the vehicle on the map based on original position data received from a position determination unit;
    receiving a voice input including voice position information for a vehicle, after the step of determining an original position;
    recognizing the received voice position information; and
    setting a new position of a vehicle on a map based on the received voice position information,
    wherein the voice position information identifies the new position relative to the original position.

11. The position correcting method as in claim 10, wherein the voice position information identifies a specific location on the map.

12. The position correcting method is in claim 11, wherein the specific location is one of: an exit of a parking garage, and on an elevated road, and on a ground level road.

13. The position correcting method as in claim 10, wherein the original position data identified the vehicle as being on a toll road and the voice position information identifies the vehicle as being on a local road adjacent to the toll road.

14. The position correcting method as in claim 10, wherein the original position data identified the vehicle as being on a local road and the voice position information identifies the vehicle as being on a toll road adjacent to the local road.

15. The position correcting method as in claim 10, wherein the original position data identified the vehicle as being on an elevated road and the voice position information identifies the vehicle as being on a ground level road beneath the elevated road.

16. The position correcting method as in claim 10, wherein the original position data identified the vehicle as being on a ground level road and the voice position information identifies the vehicle as being on an elevated road above the ground level road.

17. The current position correcting method as in claim 6, wherein the specific location is one of: on a toll road, and on a local road.

18. The vehicle navigation system as in claim 8, wherein the specific location is one of: on a toll road, and on a local road.

19. The position correcting method is in claim 11, wherein the specific location is one of: on a toll road, and on a local road.

* * * * *